US010384321B2

(12) United States Patent
Nakamaru

(10) Patent No.: US 10,384,321 B2
(45) Date of Patent: Aug. 20, 2019

(54) COOLANT APPLICATION DEVICE

(71) Applicant: MINEBEA MITSUMI Inc., Kitasaku-gun, Nagano (JP)

(72) Inventor: Yoshikazu Nakamaru, Annaka (JP)

(73) Assignee: MINEBEA MITSUMI INC., Kitasaku-gun (JP)

( * ) Notice: Subject to any disclaimer, the term of this patent is extended or adjusted under 35 U.S.C. 154(b) by 283 days.

(21) Appl. No.: 15/524,178

(22) PCT Filed: Nov. 27, 2015

(86) PCT No.: PCT/JP2015/083386
§ 371 (c)(1),
(2) Date: May 3, 2017

(87) PCT Pub. No.: WO2016/088672
PCT Pub. Date: Jun. 9, 2016

(65) Prior Publication Data

US 2017/0355054 A1 Dec. 14, 2017

(30) Foreign Application Priority Data

Dec. 5, 2014 (JP) ................................ 2014-246555

(51) Int. Cl.
*B23Q 11/10* (2006.01)
*B05B 3/02* (2006.01)
*F16D 3/04* (2006.01)

(52) U.S. Cl.
CPC ................ *B23Q 11/10* (2013.01); *B05B 3/02* (2013.01); *B05B 3/025* (2013.01); *B23Q 11/103* (2013.01); *B23Q 11/1084* (2013.01); *F16D 3/04* (2013.01)

(58) Field of Classification Search
CPC ... B23Q 11/10; B23Q 11/1084; B23Q 11/103; B05B 3/02; B05B 3/025; F16D 3/04
See application file for complete search history.

(56) References Cited

U.S. PATENT DOCUMENTS 2,488,769 A * 11/1949 Engstrom ................ F16D 3/04 277/572
2,766,065 A * 10/1956 Joyslen .................. B05B 3/003 173/93.6

(Continued)

FOREIGN PATENT DOCUMENTS

JP H06-159379 A 6/1994
JP H09-131700 A 5/1997

(Continued)

OTHER PUBLICATIONS

Jan. 26, 2016 International Search Report issued with International Patent Application No. PCT/JP2015/083386.

*Primary Examiner* — Michael A Riegelman
(74) *Attorney, Agent, or Firm* — Oliff PLC

(57) ABSTRACT

The present invention provides a technique in which service life of a coolant application device can be extended. The coolant application device includes a nozzle body which spouts coolant, a hollow shaft which rotates the nozzle body, a motor which controls a rotation angle of the hollow shaft, and an Oldham coupling portion which connects the hollow shaft and an output shaft of the motor, the Oldham coupling portion transmits driving force of the motor to the hollow shaft, allowing a misalignment between an axis of the hollow shaft and an axis of the output shaft.

8 Claims, 4 Drawing Sheets

(56) References Cited

U.S. PATENT DOCUMENTS

| | | | | | |
|---|---|---|---|---|---|
| 4,384,859 | A * | 5/1983 | Teramachi | F16C 29/008 384/45 |
| 4,811,902 | A * | 3/1989 | Nagata | B05B 3/0422 134/181 |
| 5,180,336 | A * | 1/1993 | Guttinger | F01C 17/066 464/102 |
| 5,226,852 | A * | 7/1993 | Asaba | F16D 3/04 464/104 |
| 5,452,854 | A * | 9/1995 | Keller | B05B 7/226 219/121.47 |
| 5,782,410 | A * | 7/1998 | Weston | B05B 12/085 239/583 |
| 5,865,374 | A * | 2/1999 | Barta | B05B 3/02 134/123 |
| 6,179,716 | B1 * | 1/2001 | Asa | F16D 3/04 464/153 |
| 6,464,589 | B1 * | 10/2002 | Shinozuka | F16D 3/04 464/102 |
| 2003/0173851 | A1 * | 9/2003 | Kudou | H02K 5/08 310/156.12 |
| 2004/0074468 | A1 * | 4/2004 | Makino | F01C 21/008 123/196 R |
| 2004/0205956 | A1 | 10/2004 | Kudou et al. | |
| 2005/0096139 | A1 * | 5/2005 | Hensel | F16D 3/04 464/104 |
| 2009/0230825 | A1 * | 9/2009 | Braun | F16D 3/04 310/75 D |
| 2010/0144452 | A1 * | 6/2010 | Muenich | F16D 3/04 464/105 |
| 2012/0264525 | A1 * | 10/2012 | Asa | F16D 3/04 464/102 |
| 2012/0267451 | A1 * | 10/2012 | Ogihara | B23Q 11/1076 239/240 |
| 2013/0257233 | A1 * | 10/2013 | Maeda | F16D 3/04 310/75 D |
| 2017/0293248 | A1 * | 10/2017 | Yoshida | G03G 15/6529 |
| 2017/0355054 | A1 * | 12/2017 | Nakamaru | B23Q 11/10 |

FOREIGN PATENT DOCUMENTS

| | | | |
|---|---|---|---|
| JP | 2003-230246 | A | 8/2003 |
| JP | 2004-293637 | A | 10/2004 |
| JP | 2012-228739 | A | 11/2012 |

* cited by examiner

COOLANT APPLICATION DEVICE

TECHNICAL FIELD

The present invention relates to a coolant application device.

BACKGROUND ART

In machining such as cutting, grinding, etc., using a machine tool, the machining is carried out while supplying coolant (cutting oil, grinding oil, air, etc.) to a cutting zone for lubrication, cooling, chip removal and preventing welding of chips. The coolant application device is used as a device for applying this coolant to the cutting zone. In the coolant application device, the coolant is precisely jetted to the cutting zone by using a motor to drive a nozzle for spouting the coolant, and by adjusting the position or the angle of the nozzle according to the tool change or the progress of machining process. For example, a well-known coolant application device is described in Patent Publication 1.

Patent Publication 1 is Japanese Unexamined Patent Application Publication No. 2012-228739.

DISCLOSURE OF THE INVENTION

Problems Solved by the Invention

In the coolant application device, since the coolant is jetted in a perpendicular direction to a rotating shaft of the nozzle, the force acts in a perpendicular direction to the axis of the rotating shaft during operation. The load due to this force is applied to bearings and other parts. This is a factor that shortens the service life of the device. In addition, misalignment between the axes (shift of shaft positions) of the output shaft of the motor and the rotating shaft of the nozzle may exist. This misalignment is attributable to dimensional accuracy of parts and assembly accuracy of the device. In the coolant application device, the nozzle moves so as to swing. When the above misalignment of the shaft axes occurs, a load is applied to bearings and other parts, and the service life of the device is shortened.

In view of such circumstances, the object of the present invention is to provide a technique which can extend the service life of the coolant application device.

Means for Solving the Problems

A first aspect of the present invention is characterized in that a coolant application device includes: a motor with a driving shaft, a driven shaft driven and rotated by the driving shaft, a nozzle connected to and rotated by the driven shaft that spouts coolant in a perpendicular direction to the driven shaft, and an Oldham coupling provided between the driving shaft and the driven shaft.

According to the first aspect, force perpendicular to a direction of the shaft axis which is generated by spouting the coolant from the nozzle and which is applied to the driven shaft is absorbed by the Oldham coupling. Therefore, high load applied to bearings and other parts is suppressed, wear and deformation of parts is prevented, and service life of the device can be extended.

In addition, according to the first aspect, the load is applied to the Oldham coupling; however, since the load is absorbed in the Oldham coupling, wear of parts mainly occurs at the Oldham coupling. Therefore, the service life of the device can be extended by replacing parts of the Oldham coupling.

A second aspect of the present invention is characterized in that in the coolant application device according to the first aspect, the Oldham coupling includes an intermediate member that engages a member of a driving shaft side at one end surface thereof and that engages the driven shaft or a member of a driven shaft side at the other end surface thereof, where a hole is provided at the center of the intermediate member, and the driving shaft passes through the hole.

According to the second aspect, a structure which can be easily assembled is provided since the hole functions as an guiding hole in assembly. Furthermore, in the case in which shaft axes at a driving side and at a driven side are misaligned, the misalignment of the shaft axes is limited and falling or large displacement of the intermediate member is prevented.

A third aspect of the present invention is characterized in that in the coolant application device according to the second aspect, the intermediate member has a recessed part or a protruding part formed parallel to a radial direction for engaging at least one of the driven shaft and the member of the driven shaft side, and a groove parallel to a radial direction is formed at both sides of the recessed part or at the protruding part.

A fourth aspect of the present invention is characterized in that in the coolant application device according to the second aspect or the third aspect, the intermediate member has a lower hardness than that of the driving shaft side member.

A fifth aspect of the present invention is characterized in that in the coolant application device according to any one of the second aspect to the fourth aspect, the intermediate member has a lower hardness than that of the driven shaft or the driven shaft side member.

A sixth aspect of the present invention is characterized in that a coolant application device includes: a nozzle for injecting coolant, a motor for controlling a spouting direction of the coolant by rotating the nozzle, a housing, a hollow shaft rotatably and in a liquid-tightly inserted in the housing and comprising a coolant passage inside thereof, multiple through holes provided on a side wall of the hollow shaft, and an inlet passage provided in the housing and connected to the coolant passage via multiple through holes, wherein the nozzle is connected to the hollow shaft, and the hollow shaft is connected to an output shaft of the motor via an Oldham coupling.

A seventh aspect of the present invention is characterized in that in the coolant application device according to the sixth aspect, the Oldham coupling comprises an intermediate member that engages a member of an output shaft side of the motor at one end surface thereof and that engages the hollow shaft or the member of the hollow shaft side at the other end surface thereof, where a hole is provided at the center of the intermediate member, and an output shaft of the motor passes through the hole.

A eighth aspect of the present invention is characterized in that in the coolant application device according to the seventh aspect, the intermediate member has a recessed part or a protruding part formed parallel to a radial direction for engaging at least one of the hollow shaft and the member of the hollow shaft side, and a groove parallel to a radial direction is formed at both sides of the recessed part or at the protruding part.

A ninth aspect of the present invention is characterized in that in the coolant application device according to the seventh aspect or the eighth aspect, the intermediate member has a lower hardness than that of an output shaft side member of the motor.

A tenth aspect of the present invention is characterized in that in the coolant application device according to any one of the seventh aspect to the ninth aspect, the intermediate member has a lower hardness than that of the hollow member or the hollow shaft side member.

An eleventh aspect of the present invention is characterized in that in the coolant application device according to any one of the first aspect to the tenth aspect, it further includes a space for housing a circuit board to which a lead wire is connected, and the circuit board is sealed inside of the space with resin.

A twelfth aspect of the present invention is characterized in that in the coolant application device according to the eleventh aspect, the circuit board to which the lead wire is connected is embedded in resin in a container placed inside of the space.

According to the present invention, the service life of the coolant application device can be extended.

PREFERRED EMBODIMENTS OF THE INVENTION

1. First Embodiment

Structure

Figure 1:
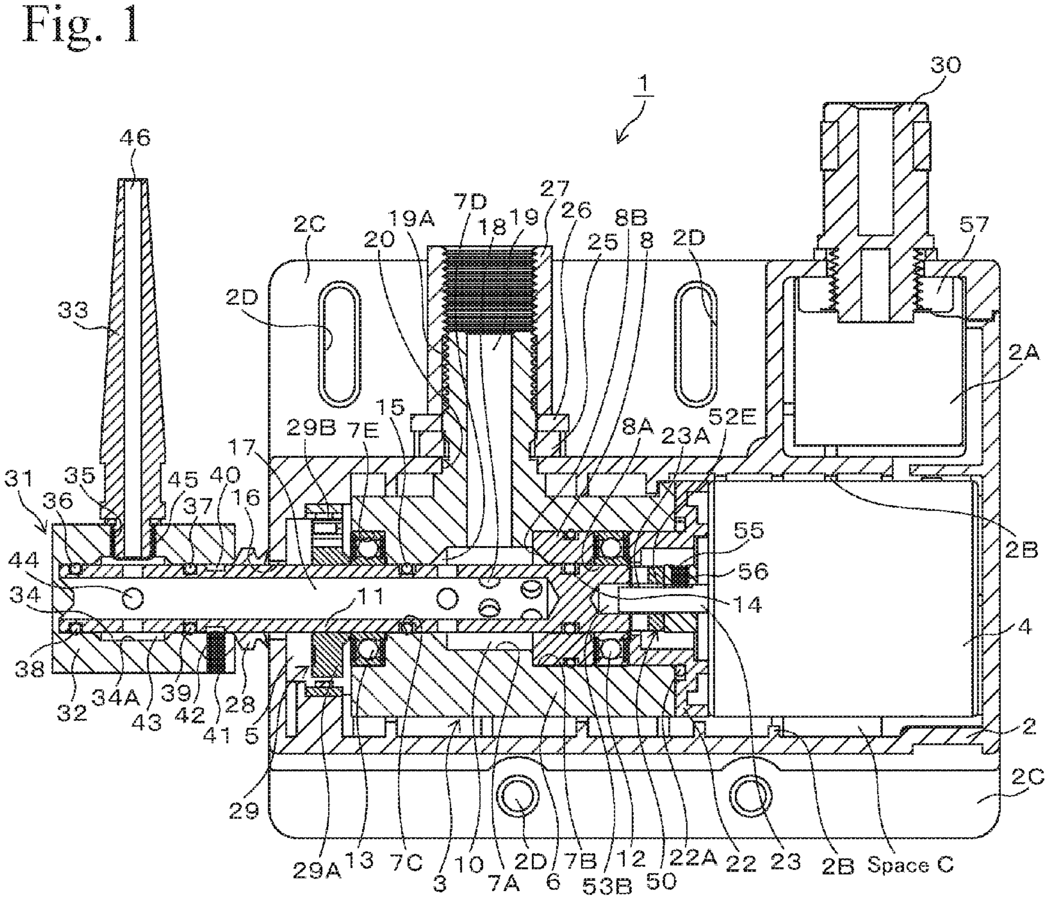
FIG. 1 is a longitudinal cross-sectional view showing a coolant application device according to an embodiment.

FIG. 1 shows a coolant application device 1 according to the present embodiment. The coolant application device 1 is attached to a numerical control (NC) machine tool such as an NC drilling machine, an NC milling machine, an NC lathe, a machining center, etc., and it spouts the coolant at a cutting zone. The coolant application device 1 includes a case 2. In the case 2, a movable nozzle unit 3 and a motor 4 are contained in an integrated condition. A sensor chamber 5 is formed between an end portion inside the case 2 and the movable nozzle unit 3.

The movable nozzle unit 3 has a housing 6. The housing 6 has an outer shape which is approximately rectangular, and an opening with steps, which includes a middle diameter bore 7A at a center portion and a large diameter bore 7B and a small diameter bore 7C at end portions, is passed through the housing 6. A guide member 8 with a guide bore 8A having the same diameter as that of the small diameter bore 7C is in a liquid-tight manner engaged with the large diameter bore 7B. A hollow shaft 11 passed through the housing 6 is rotatably and liquid-tightly inserted in the small diameter bore 7C of the housing 6 and the guide bore 8A of the guide member 8. Thus, an inlet chamber 10 is formed between the middle diameter bore 7A of the housing 6 and the hollow shaft 11. Taper portions 7D and 8B which are connected to the inlet chamber 10 are formed on a step between the middle diameter bore 7A and the small diameter bore 7C and on an end portion of the guide member 8 at a side of the inlet chamber 10. The housing 6 is made of an appropriate material such as synthetic resin, etc., and can be properly lightened.

The hollow shaft 11 is a rotating shaft for rotating a nozzle 33 so as to swing it. The hollow shaft 11 is rotatably held in the housing 6 by a bearing 12 which is fitted to the guide member 8 adjoined to the large diameter bore 7B of the housing 6, and a bearing 13 which is fitted to a bearing bore 7E formed on an end portion at a side of the small diameter portion 7C of the housing 6. Spaces between the hollow shaft 11 and the small diameter bore 7C of the housing 6 or the guide bore 8A of the guide member 8 are sealed by O-rings 14,15, respectively. The O-rings 14,15 are a multi-stage type seal using multiple rings. The hollow shaft 11 passes through a sensor chamber 5, passes through an opening 16 formed on an end portion of the case 2, and extends outside the case 2.

In the hollow shaft 11, a coolant passage 17 which extends along a shaft center axis is formed, and the coolant passage 17 is opened at the end of the hollow shaft 11 extending to the outside of the case 2, and is closed at the end on the side of the motor 4. Multiple through holes 18 that communicates the coolant passage 17 and the inlet chamber 10 are passed through the sidewall of the hollow shaft 11. On the sidewall of housing 6, an inlet passage 19 communicating with the inlet chamber 10 is formed. The inlet passage 19 protrudes from the housing 6 and extends to the outside of the case 2 by penetrating an opening 20 provided on the sidewall of the case 2.

Figure 2:
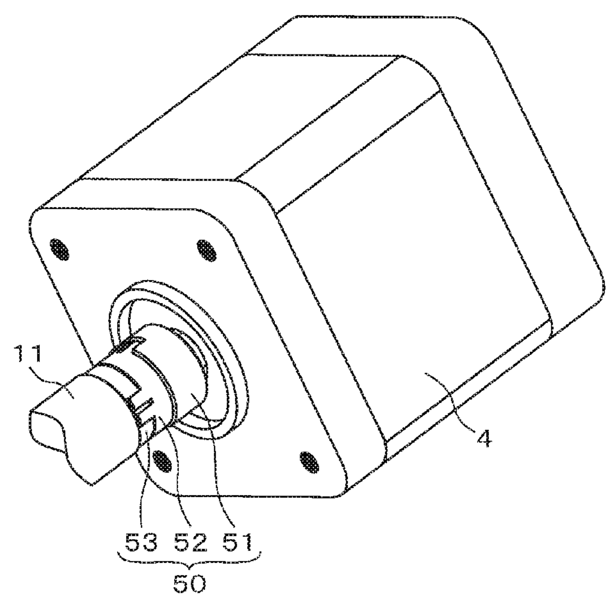
FIG. 2 is a perspective view showing an example of a state in which a shaft is connected to a motor via a shaft coupling.
Figure 3:
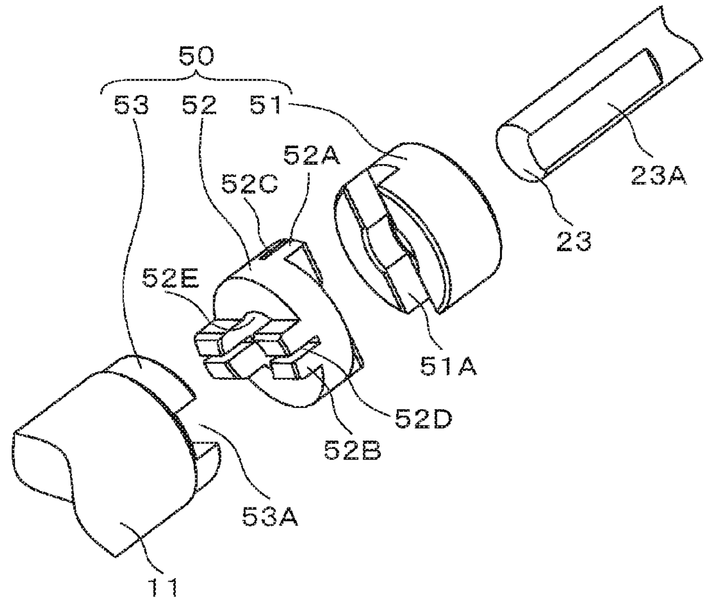
FIG. 3 is an exploded perspective view of FIG. 2.

The end of the hollow shaft 11 and the output shaft 23 of the motor 4 are connected by the Oldham coupling portion 50. Driving force of the motor 4 is transmitted to the hollow shaft 11 via the Oldham coupling portion 50. FIGS. 2 and 3 show a perspective view and an exploded perspective view of a state in which the output shaft 23 of the motor 4 and the hollow shaft 11 are connected by the Oldham coupling portion 50. Here, the output shaft 23 is an example of a driving shaft, and the hollow shaft 11 is an example of a driven shaft that is driven and rotated by driving force of the output shaft 23.

The Oldham coupling portion 50 is formed by a coupler 51 fixed to the output shaft 23 of the motor 4, a joint 52 that engages the coupler 51, and a hub 53 that engages the joint 52. Here, the coupler 51 is an example of a member at a driving side, and the hub 53 is an example of a member at a driven side. A screw hole 55 shown in FIG. 1 is formed on the coupler 51. The coupler 51 is fixed to the output shaft 23 by pressing a screw 56 screwed in this screw hole 55 to a flat portion 23A (see FIG. 3). Here, the screw hole 55 and the screw 56 are not shown in FIGS. 2 and 3.

A groove 51A that extends perpendicular to the shaft direction is formed on the coupler 51. A protruding part 52A that extends perpendicular to the shaft direction, whose cross-sectional shape is convex, is formed on the joint 52. The coupler 51 and the joint 52 are engaged by matching an extending direction of the groove 51A and an extending direction of the protruding part 52A and engaging them. Here, the dimension of the groove 51A and the protruding part 52A is set to be in a loose fit condition so as to be relatively slidable. In a state in which the groove 51A and the protruding part 52 are engaged, they can relatively slide in the extending direction. Thus, the coupler 51 and the joint 52 are engaged in a state in which they are slidable in a direction perpendicular to the shaft and capable to transmit driving force. Here, the shaft direction means the extending direction of the output shaft 23 and the hollow shaft 11.

The protruding part 52B with a convex cross-sectional shape and extending in a perpendicular direction to a shaft direction is formed on a side opposite to the side in which the protruding part 52A of the joint 52 is formed. The protruding part 52B and the protruding part 52A both extends in a plane perpendicular to the shaft, and the extending direction of the protruding part 52B and the extending direction of the protruding part 52A cross at right angle.

Figure 4:
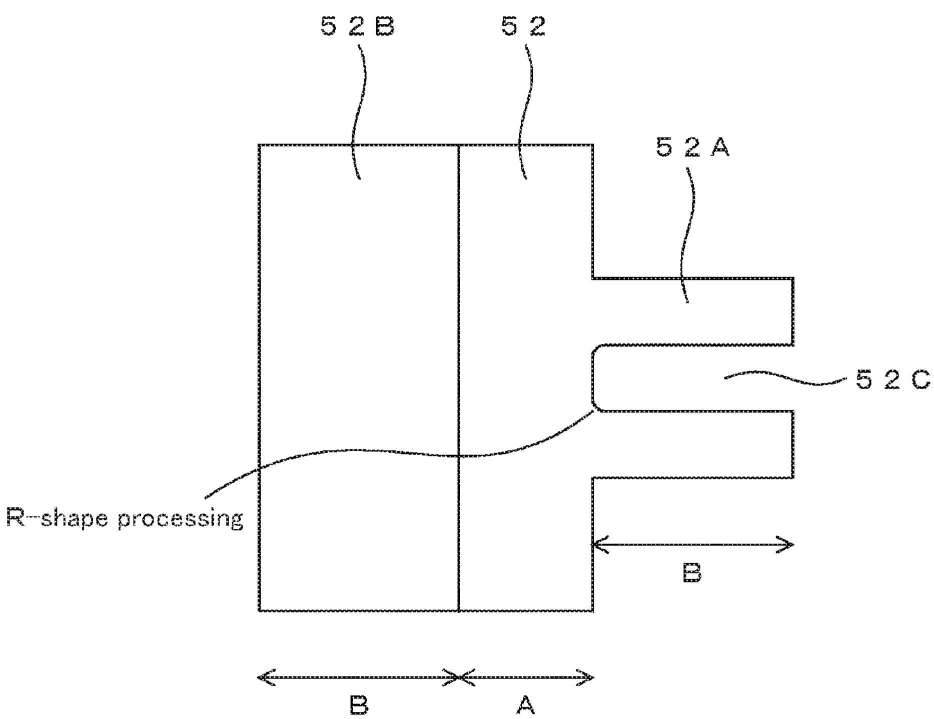
FIG. 4 is a partially enlarged view showing a joint of an embodiment.

FIG. 4 shows a side view of the joint 52. The thickness A of the joint 52 in the shaft direction shown in FIG. 4 and the height B of the protruding parts 52A and 52B in the shaft direction are preferably set in a range of A:B=1:1 to 0.5:1.

The hub 53 is a part of the hollow shaft 11, and it has a groove 53A that extends perpendicular to the shaft direction. The joint 52 and the hub 53 are engaged by fitting the groove 53A and the protruding part 52B in a relatively slidable manner. Here, the dimensions of the groove 53A and the protruding part 52B are set to be in a loose fit condition so as to be relatively slidable. In this state, the joint 52 and the hub 53 are engaged in a manner that they are slidable in a direction perpendicular to the shaft and capable to transmit the driving force. Here, a slidable direction of the coupler 51 and the joint 52 and a slidable direction of the joint 52 and the hub 53 cross at right angle.

A through hole in which the output shaft 23 passes through is formed on the axis centers of the coupler 51, the joint 52 and the hub 53. Here, a through hole 52E that contains the output shaft is formed on the joint 52. The through hole 52E has an inner diameter greater than the outer diameter of the output shaft 23, and has a structure in which the joint 52 can move relative to the coupler 51 (can move in-plane perpendicular to the shaft). In the same manner, a cavity portion 53B (see FIG. 1) where the output shaft 23 is contained loosely with sufficient space is formed at an end of the hollow shaft 11, so that the hub 53 can move relative to the coupler 51 and the joint 52 (can move in-plane perpendicular to the shaft).

A slit 52C that extends in the same direction as the extending direction of the protruding part 52A is formed at the center of the protruding part 52A of the joint 52. The depth (dimension in the shaft direction) of the slit 52C is set to be slightly greater than the height of the protruding part 52A. In addition, a slit 52D that extends in the same direction as the extending direction of the protruding part 52B is formed at the center of the protruding part 52B of the joint 52. The depth of the slit 52D is set to be slightly greater than the height of the protruding part 52A. The slit 52C is a groove for tightening the engaging structure of the groove 51A and the protruding part 52A by expanding the groove width using a wedge or the like. The slit 52D is a groove for tightening the engaging structure of the groove 53A and the protruding part 52B by expanding a groove width using a wedge or the like.

As shown in FIG. 4, corners of the bottom portion of the slit 52C may be processed into an R-shape. Alternatively, the bottom portion may be processed, so that a cross-sectional shape is semicircular. By processing the corners of the bottom portion of the slit 52C into an R-shape, cracks are prevented from being generated on the joint 52 when the groove width is expanded by wedge or the like, as described above. In the case in which the corners of the groove bottom portion of the slit 52C are not processed into an R-shape, the cracks are generated more easily due to stress concentration when the groove width is expanded by a wedge or the like. The R-shape of the bottom portion of this slit can be samely applied to the slit 52D.

The Oldham coupling portion 50 transmits driving force of the output shaft 23 to the hollow shaft 11. Here, the coupler 51 and the hub 53 are made of relatively hard material, and the joint 52 is made of relatively soft material. In the present embodiment, the coupler 51 and the hub 53 are made of stainless steel that is relatively hard, and the joint 52 is made of brass that is relatively soft. The reason of making the joint 52 with a relatively soft material is to extend the service life of the coupler 51 and the hub 53 by concentrating wear in a long term use of the Oldham coupling portion 50 to the joint 52, and make only the joint 52 that can be easily disconnected and replaced as a wear-out part.

Instead of brass, the joint 52 can also be made of aluminum or resin. In this case, the coupler 51 and the hub 53 are made of harder material than the material that makes up the joint 52.

As shown in FIG. 1, a casing of the motor 4 is connected at the end portion of the housing 6 via a connecting member 22. The housing 6 and the motor 4 are integrated by this structure. The hollow shaft 11 and the output shaft 23 of the motor 4 is coaxially positioned by the connecting member 22. The gap between the connection member 22 and the housing 6 are sealed by an O-ring 22A.

The motor 4 can control a rotation angle of the output shaft, and for example, a stepping motor may be adopted. As a stepping motor, a variable reluctance type stepping motor, a permanent-magnetic type stepping motor, or a hybrid type stepping motor that combines these types of motors can be used. In the present embodiment, the hybrid type stepping motor is adopted, since the adjustable step angle is sufficiently small.

A portion of the housing 6 at a side in which an inlet passage 19 is formed is protruded outwardly from the opening 20 of the case 2. A screw portion 19A is formed on an outer circumference of this protruded portion, and a pipe joint 27 is screwed into this screw portion 19A. The outer diameter of the pipe joint 27 is greater than that of the opening 20, and a seal element 25 made of elastomer (rubber washer, etc.) and a washer 26 are sandwiched between the pipe joint 27 and the case 2. By screwing the pipe joint 27 into the screw portion 19A, the housing 6 combined with the motor 4 in one body is fixed to the case 2. A space between the hollow shaft 11 protruded outwardly from the opening 16 of the case 2 and the opening 16 of the case 2 is sealed by a lip seal 28 attached to the hollow shaft 11.

In the sensor chamber 5, an origin sensor 29 for detecting the origin position of the rotation angle of the hollow shaft 11 is provided. The origin sensor 29 has a magnet holder 29A fixed to the hollow shaft 11 and a magnetic detecting element 29B such as a Hall element, fixed to the side of the case 2 facing the magnet holder 29A. A magnet is held on the magnet holder 29A. When the hollow shaft 11 is rotated, the magnet of the magnet holder 29A is rotated with hollow shaft 11, and the output of the magnetic detecting element 29B is changed. The detection of origin position of the hollow shaft 11 is performed based on the variation in this output of the magnetic detecting element 29B. The lead wires (not shown) connected to the motor 4 and the origin sensor 29 are connected to an external control circuit (not shown) via a connector 30 provided on the case 2.

In the case 2, an air supplying port (not shown) for supplying air to the inside of the case 2 may be formed, and contaminants such as splashes of the coolant, fine chips, etc., can be prevented from entering into the case 2 by supplying air from the air supplying port so as to maintain the inside of the case 2 to have positive pressure at all times.

At the end portion of the hollow shaft 11 protruding outwardly from the case 2, a nozzle 31 is attached in a perpendicular direction to the hollow shaft 11. The nozzle 31 has an integrated structure in which a tapered nozzle body 33 is attached to the nozzle holder 32 extending in a perpendicular direction to the nozzle holder 32 which has an approximately bottomed cylindrical shape and is fitted to the hollow shaft 11.

The nozzle holder 32 of approximately bottomed cylindrical shape has a bore 34 in which the hollow shaft 11 is inserted and fitted, and a large diameter portion 34A with an enlarged diameter is formed at a middle portion of the bore 34. A screw hole 35 that communicates with the large diameter portion 34A is passed through on a sidewall of the nozzle holder 32. On the outer circumference of the end portion of the hollow shaft 11 protruding outwardly from the case 2, seal grooves 36,37 are formed respectively on each of both sides of the large diameter portion 34A of the bore 34, at the positions which are opposite when the hollow shaft 11 is inserted in the bore 34 of the nozzle holder 32. The gap between the bore 34 and the hollow shaft 11 is sealed by attaching O-rings 38,39 to the seal grooves 36,37. On the outer circumference of the hollow shaft 11, an annular fixing groove 40 is further formed at a side nearer to a base end than the seal groove 37. The screw hole 42 facing the fixing groove 40 of the hollow shaft 11 is passed through the sidewall of the nozzle holder 32. Then, the nozzle holder 32 is fixed to the hollow shaft 11 by inserting the end portion of the hollow shaft 11 in the bore 34 of the nozzle holder 32, and screwing the set screw 41 in the screw hole 42 to engage and press the tip to the fixing groove 40 of the hollow shaft 11. The insertion position of the hollow shaft 11 is regulated by abutting the end on the bottom of the bore 34. A nozzle chamber 43 is formed between the large diameter portion 34A of the bore 34 and the hollow shaft 11 by inserting the hollow shaft 11 in the bore 34.

Multiple nozzle through holes 44 communicating with the nozzle chamber 43 penetrate the sidewall of the hollow shaft 11 inserted in the bore 34 of the nozzle holder 32. In the present embodiment, four nozzle through holes 44 are formed at even intervals in circumferential direction. The cross-sectional area of each nozzle through hole 44 is smaller than that of the coolant passage 17 of the hollow shaft 11, and total cross-sectional area of the multiple nozzle through holes 44 is greater than that of the coolant passage 17.

In this embodiment, the nozzle body 33 extends perpendicular to the axial direction of the hollow shaft 11. The nozzle body 33 in a tapered shape is attached to the nozzle holder 32 by screwing the screw portion 45 formed at a base end portion in the screw hole 35 of the nozzle holder 32. A nozzle passage 46 is passed through the nozzle body 33 in its axial direction, a base end portion of the nozzle passage 46 is connected to the nozzle chamber 43, and an opening is formed at the tip of the nozzle body 33. The cross-sectional area of the nozzle passage 46 is smaller than that of the coolant passage 17 of the hollow shaft 11.

Next, the structure of the case 2 will be explained in more detail. The case 2 is a main body having an approximately rectangular box whose inside is sealed and contains the movable nozzle unit 3 and the motor 4. In FIG. 1, the connector portion 2A that gathers lead wires connected to the motor 4 and the origin sensor 29 contained in case 2 protrudes from the upper portion of the end portion of case 2. At the upper portion of the connector portion 2A, a connector 30 for connecting these lead wires to an external control circuit is attached by using nuts 57.

On the inner surface of the case 2, multiple ribs 2B protrude along a longitudinal direction or the direction perpendicular to the longitudinal direction. Then, when the movable nozzle unit 3 (housing 6) and the motor 4 integrally connected by the connecting member 22 are fixed to the case 2 by the pipe joint 27 via the seal element 25 and the washer 26, a gap C is formed between the housing 6 or the motor 4 and the inner wall of the case 2 by abutting tips of at least part of ribs 2B on the housing 6 or the motor 4. The movable nozzle unit 3 (housing 6) and the motor 4 integrated by the connecting member 22 are elastically supported on the case 2 by screwing the pipe joint 27 into the screw portion 19A of the inlet passage 19 and by attaching to the case 2 via the seal element 25 made of elastomer. Furthermore, since the movable nozzle unit 3 and the motor 4 are fixed only to one location of the case 2, the gap C can be easily formed without contacting other portions to the inner wall of the case 2.

On the back side of the case 2, an attaching plate 2C in an approximately rectangular plate shape is integrally formed. Attaching holes 2D in an appropriate shape, such as a circular hole or an elongated hole, is formed on the attaching plate 2C. The coolant application device 1 can be attached to a machine tool or the like by inserting a suitable fastener such as a bolt, etc., in the attaching hole 2D.

In the present embodiment, the case 2 is made of synthetic resin considering productivity and reduction of weight. However, it may be made of metal such as die cast aluminum or other materials. Also, the case 2 may be made partially of metal.

Functions

The coolant application device 1 is attached to an automatic machine tool such as an NC machine tool, a machining center, etc., directing the nozzle 31 in a suitable direction. In addition, the inlet passage 19 is connected to a supply source of the coolant including a pump via the pipe coupling 27, and the motor 4 and the origin sensor 29 are connected to a control circuit board via a connector 30 provided in the case 2. The coolant is jetted to the machining portion by being supplied from the inlet passage 19, and passing through the inlet chamber 10, the through hole 18, the coolant passage 17, the nozzle through hole 44, the nozzle chamber 43, and the nozzle passage 46 in the nozzle body 33.

Then, the rotation angle of the nozzle 31 can be adjusted and the coolant can be jetted in a desired direction by rotating the output shaft 23 of the motor 4 and controlling the rotation angle of the hollow shaft 11 connected to the output shaft 23.

In the above process for adjusting the rotation angle of the nozzle 31, even when the axis of the output shaft 23 of the motor 4 is misaligned in relation to the axis of the hollow shaft 11, the misalignment between shaft axes is allowed by an Oldham coupling portion 50. That is, torque is transmitted even when the axis of the output shaft 23 of the motor 4 is misaligned in relation to the axis of the hollow shaft 11 in a state in which the misalignment between shaft axes is compensated by the Oldham coupling portion 50. In this case, the hollow shaft 11 rotates together with the output shaft 23 in a condition that excessive load is not applied to bearings 12 and 13.

In the following, functions of the Oldham coupling portion 50 will be explained. First, the joint 52 is relatively slidable in relation to the coupler 51 in the extending direction of the groove 51A. Moreover, it is relatively slidable in relation to the hub 53 in the extending direction of the groove 53A. These two sliding directions are perpendicular to the axial direction and cross at right angles to each other.

Here, the coolant is spouted while the hollow shaft 11 is rotated. In this case, force in various directions that are perpendicular to the shaft axis is applied to the hollow shaft 11 due to the reaction to the spouting of the coolant. Although this force is perpendicular to the shaft axis, the direction thereof changes at each time in accordance with the rotation of the hollow shaft 11. This force tends to shift the axis of the coupler 51 and the axis of the hub 53. In this case, if the Oldham coupling portion 50 is not provided and the output shaft 23 and the hollow shaft 11 are directly connected, shaft positions of the output shaft 23 and the hollow shaft 11 change in accordance with the rotation of the output shaft 23, and an excessive load is applied to the bearings 12 and 13, bearings of the motor 4, etc.

In contrast, when the Oldham coupling portion 50 is provided, the above two sliding movements which cross at right angles occur dynamically, so that the shaft positions of the output shaft 23 and the hollow shaft 11 do not change with the rotation of the output shaft 23. That is, when the output shaft 23 is rotated in a state in which the shaft positions are misaligned, force which tends to move the shaft positions of the output shaft 23 and the hollow shaft 11 is generated. However, sliding of the joint 52 in relation to the coupler 51 and sliding of the joint 52 in relation to the hub 53, which cross at right angles, are generated so as to absorb this force. Thus, due to the occurrence of the two sliding movements that cross at right angles, the coupler 51, the joint 52 and the hub 53 are rotated while the shaft positions of the output shaft 23 and the hollow shaft 11 are maintained.

As described above, the joint 52 can be relatively slid in relation to the coupler 51 in the extending direction of the groove 51A, and moreover, it can be relatively slid in relation to the hub 53 in the extending direction of the groove 53A. As a result, when transmitting a rotating torque, the state in which the shaft position of the coupler 51 and the shaft position of the hub 53 are misaligned, is maintained. Therefore, undesired force which forcibly would bend the shaft direction is not applied to the output shaft 23 and the hollow shaft 11 when transmitting driving force, and excessive load is not applied to the bearings 12 and 13 and also the bearing portion at the side of the motor 4 that holds the output shaft 23. Obviously, this function serves also as a function that maintains the positional relationship between the shaft position of the coupler 51 and the shaft position of the hub 53 when these positions are previously misaligned.

The joint 52 made of relatively soft material is gradually worn down as it is used, and backlash (looseness) occurs in the engaging structure of the groove 51A and the protruding part 52A and the engaging structure of the groove 53A and the protruding part 52B. In this case, by inserting a pin or wedge in the slits 52C and 52D, and physically expanding the width of the slits, the looseness of engagement generated by the above backlash is eliminated, so that the engaging structure is more tightly engaged, that is, the backlash is eliminated or prevented.

Advantages

In the above structure, load applied to the bearings, etc., can be reduced by providing the Oldham coupling portion 50, even if the output shaft 23 of the motor 4 and the axis of the hollow shaft 11 are misaligned. Therefore, the service life of the coolant application device can be extended. In particular, when the coolant is spouted while rotating the hollow shaft 11, load is applied to the hollow shaft 11 from various directions perpendicular to the shaft axis. However, this load is absorbed by the function of the Oldham coupling portion 50, and therefore, load applied to other portions is reduced and service life of the device is extended.

In the present invention, the misalignment between the axis of the output shaft 23 of the motor 4 and the axis of the hollow shaft 11 is allowed in certain degree, and therefore, tolerance of the assembly accuracy is increased and assembly cost is decreased. Furthermore, tolerance of parts accuracy is increased and cost of parts is decreased.

As the load concentrates on the Oldham coupling portion 50, it is possible to concentrate the maintenance service to the Oldham coupling portion 50. Therefore, the maintenance becomes easier and the service life of the overall device is extended. In addition, since the joint 52 is made of relatively soft material, wear in long term use of the Oldham coupling portion 50 concentrates at the joint 52, and therefore, the life of the coupler 51 and the hub 53 can be increased and only the joint 52 which is easily disconnected and replaced can be set as a wear-out part.

The joint 52 made of relatively soft material is gradually worn during use, and backlash occurs in the engaging structure of the groove 51A and the protruding part 52A and the engaging structure of the groove 53A and the protruding part 52B. However, the backlash generated in the engaging structures can be eliminated and prevented by inserting a pin or a wedge in the slits 52C and 52D and expanding the groove width. That is, the above engaging structure can be returned to a state in which the backlash does not occur, even after the backlash has occurred therein due to the wear of the joint 52. According to this technique, labor cost and parts cost required for the replacement of the joint 52 can be reduced. By providing the slits 52C and 52D, the joint 52 can be easily deformed elastically, and the function to maintain the engaging structure of the groove 51A and the protruding part 52A and the engaging structure of the groove 53A and the protruding part 52B can be effectively obtained.

In addition, the through hole 52E and the cavity portion 53 function as a guide hole in assembly. Therefore, a structure easy to assemble can be obtained. Also, since the structure has the output shaft 23 passing through the Oldham coupling portion 50, the relative displacement of the coupler 51 and the hub 53 in relation to the joint 52 is suppressed when the backlash occurs in the engaging structure, and loss or large displacement of the joint 52 does not occur, even if the backlash in the above engaging structure is increased. In addition, the relative displacement of the coupler 51 and the hub 53 in relation to the joint 52 is limited by the output shaft 23 passing through the Oldham coupling portion 50, and the pin or the wedge is easily inserted in the slits 52C and 52D. In the present invention, standard motors can be used without modification because the structure where the output shaft 23 passes through the Oldham coupling portion 50 is allowed.

Furthermore, by adopting a structure based on the engagement of grooves and protruding parts, dimension in the axial direction of the joint 52 can be shortened, and the coupling structure can be miniaturized.

Other Matters (1) A protruding part, which is extended in a perpendicular direction to the shaft, may be formed on the coupler 51, and a recessed part which engages the above protruding part at the side of the coupler 51 may be formed on the joint 52.

That is, a convexoconcave relationship in a slidable engaging structure of the coupler 51 and the joint 52 may be the reverse of that in the case shown in FIG. 3. In this case, a structure having a groove at the engaging portion is obtained by forming a slit along the extending direction parallel to the recessed part at one side or both sides of the recessed part in the joint 52.

(2) A protruding part that is extended in a perpendicular direction to the shaft may be formed on the hub 53, and a recessed part that engages the above protruding part at a side of the hub 53 may be formed on the joint 52. That is, a convexoconcave relationship in a slidable engaging structure of the joint 52 and the hub 53 may be the reverse of that in the case shown in FIG. 3. In this case, a structure having a groove at an engaging portion is obtained by forming a slit, which can make the engagement tighter by expanding it, along the extending direction of the recessed part at one side or both sides of the recessed part in the joint 52.

The above structures (1) and (2) may be used individually or simultaneously. For example, a first structure in which the above structure (1) is adopted at only the side of the coupler 51 in the structure shown in FIG. 3, a second structure in which the above structure (2) is adopted at only the side of the hub 53 in the structure shown in FIG. 3, and a third structure in which the above structures (1) and (2) are simultaneously adopted, can be used.

For example, a structure at the side of the coupler 51, which is a member at the driving side, may be a protruding structure, a structure at the side of the joint 52, which is placed at the opposite side thereof, may be a recessed structure, a structure at the side of the hub 53, which is a member at the driven side, may be a recessed structure, and the structure at the side of the joint 52, which is placed at the opposite side thereof, may be a protruding structure. Conversely, a structure at the side of the coupler 51 may be a recessed structure, a structure at the side of the joint 52, which is placed at the opposite side thereof, may be a protruding structure, a structure at the side of the hub 53, which is a member at the driven side, may be formed to be a protruding structure, and a structure at the side of the joint 52, which is placed at the opposite side may be a recessed structure.

A slit, which can make the engagement tighter by expanding it, may be formed on only one or two among the coupler 51, the joint 52, and the hub 53. The hub 53, which is a member at the driven side, may be formed as a separated member from the hollow shaft 11 which is the driven shaft.

2. Second Embodiment

Figure 5:
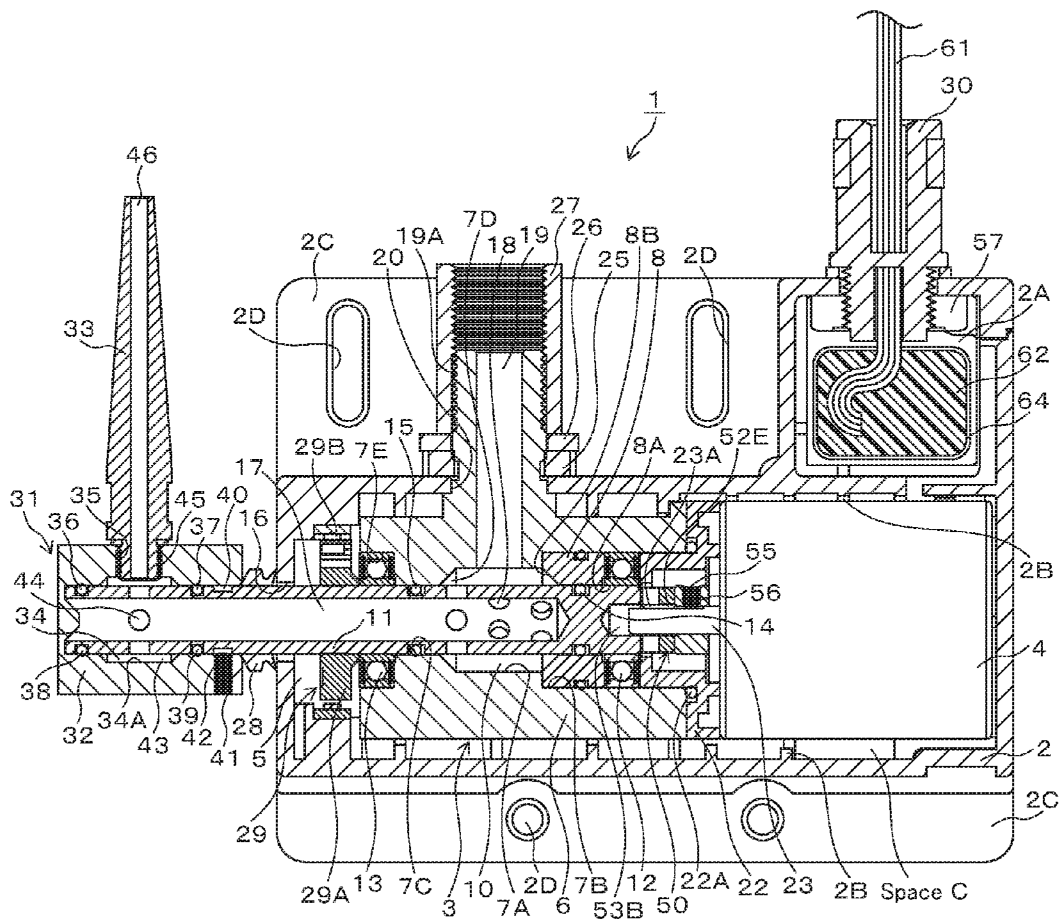
FIG. 5 is a longitudinal cross-sectional view showing a coolant application device according to an embodiment.
Figure 6:
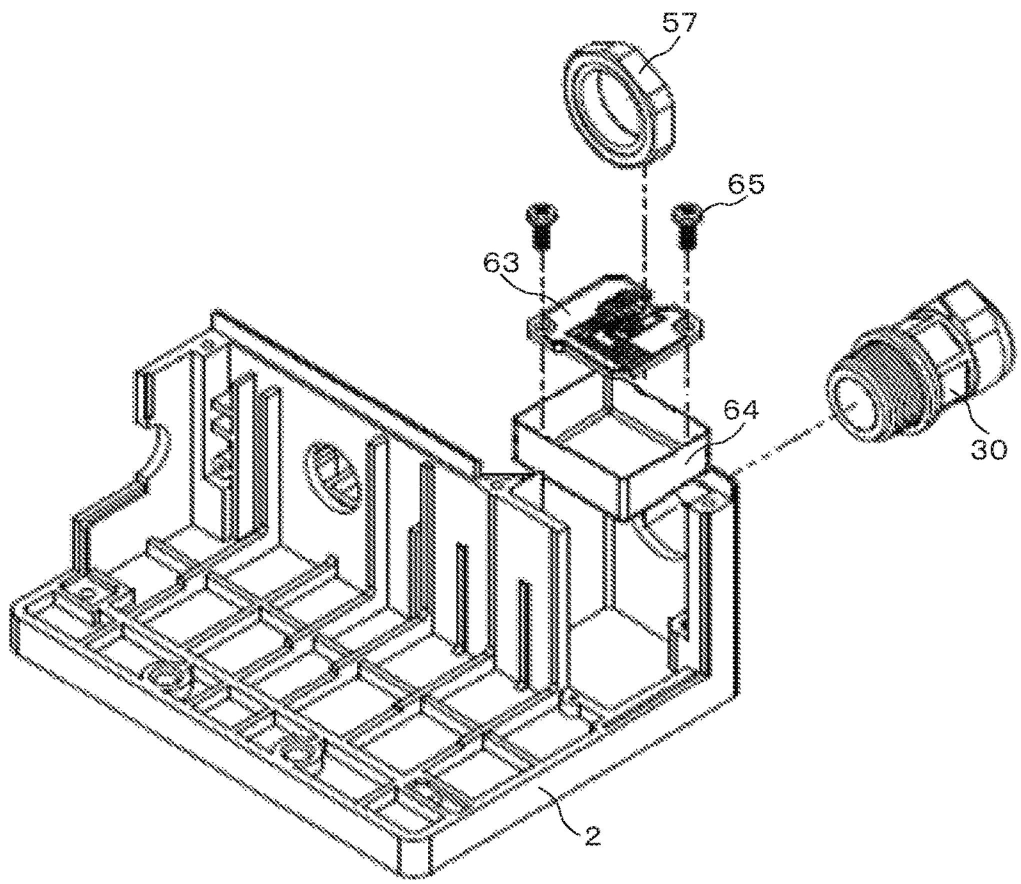
FIG. 6 is a rear perspective view showing the coolant application device shown in FIG. 5 partially assembled.

In the following, an example of a circuit board in which multiple lead wires are soldered to a connector portion 2A in FIG. 1, will be explained. FIG. 5 is a longitudinal cross-sectional view showing a coolant application device according to an embodiment of the present invention. Here, parts denoted by the same numeral references in FIG. 1 are the same to those explained in FIG. 1. In this example, a circuit board 63 (see FIG. 6), to which lead wires are connected and which is sealed by resin 62, is housed in the inside space of the connector portion 2A. Note that, in FIG. 5, the circuit board 63 in FIG. 6 is not shown, since it is covered by resin 62.

On the circuit board 63, multiple lead wires 61 and lead wires (not shown) connected to the motor 4 are soldered. The multiple lead wires 61 connected to the circuit board 63 are pulled out from the coolant application device 1 via a connector 30, and it is connected to an external control circuit (not shown).

The inside of the connector portion 2A is filled with the resin 62 so that the circuit board 63 has a waterproof structure. In this structure, soldered joint portions between the lead wires 61 pulled out or the lead wires (not shown) connected to the motor 4 and the circuit board 63 and soldered portions of electronic components on the circuit board 63, are embedded and sealed by the resin 62. That is, electrical connecting portions gathered inside of the connector portion 2A are embedded in the resin, so as to have a waterproof structure.

For example, a water-soluble coolant is often used in a machine tool. In this case, when the above waterproof structure is not adopted, the water-soluble coolant infiltrates into the connector portion 2A causing a problem in that the circuit board 63 or the connection portions of the lead wires 61 short-circuit and failure. According to the above structure, the above problem about short-circuiting can be avoided even if the water-soluble coolant is used because the connector portion 2A have a waterproof structure.

In the following, a method for forming the above waterproof structure will be explained with reference to FIG. 6. FIG. 6 is a perspective rear view showing the coolant application device 1 in FIG. 5 during assembly. In FIG. 6, parts that are unnecessary for explanation are not shown in order to facilitate the understanding.

First, the connector 30 is inserted into the opening of a case 2, as shown in FIG. 6, and the connector 30 is fixed to the case 2 by screwing and tightening the male screw portion of the connector 30 into the inside of the nut 57. Next, the circuit board 63 is housed in a plastic container 64, and the circuit board 63 is fixed to the case 2 with the plastic container 64 by screw 65. Here, lead wires 61 of FIG. 5 (not shown in FIG. 6) and lead wires connected to the motor 4 are connected to the circuit board 63. When the circuit board 63 is fixed to the case 2, the lead wires 61 connected to the circuit board 63 are pulled out via the connector 30.

Next, liquid resin 62 (see FIG. 5) is injected in the inside of the plastic container 64 and is cured. Here, by curing the resin 62, the circuit board 63 and part of the lead wires 61 containing the soldered portion is embedded in the resin 62. According to this waterproof structure, the circuit board 63 is prevented from short-circuiting when the water-soluble coolant infiltrates into the connector portion 2A.

As described above, the waterproof construction, which is inexpensive, can be easily realized without using a die, etc., by placing the circuit board 63 in the plastic container and embedding it in resin. This plastic container does not need to have a particularly high strength because it is sufficient if the plastic container could provide peripheral walls that surround in all directions to hold the resin until it is cured. For example, the container may have thin peripheral walls in a film shape. Instead of the plastic container, a resin holding portion surrounded by peripheral walls may be formed in the connector portion 2A and may be embedded with resin after placing the circuit board 63 therein. As the resin 62 filled in the connector portion 2A, two-liquid type epoxy resins, which can be cured at room temperature, may be used. Here, it is difficult to use thermosetting resins since the coolant application device during assembly must be heated, and in contrast, it is difficult to use UV curable resins since a thick layer cannot be easily formed. In the structure shown in FIG.

5, a waterproof function can be further improved by embedding the sensor portion 29 in resin.

EXPLANATION OF REFERENCE SYMBOLS

1 . . . coolant application device, 2 . . . case, 2A . . . connector portion, 2B . . . rib, 2C . . . attaching plate, 3 . . . movable nozzle unit, 4 . . . motor, 5 . . . sensor chamber, 6 . . . housing, 7A . . . middle diameter bore, 7B . . . large diameter bore, 7C . . . small diameter bore, 7D . . . taper portion, 7E . . . bearing bore, 8 . . . guide member, 8A . . . guide bore, 8B . . . taper portion, 10 . . . inlet chamber, 11 . . . hollow shaft, 12 . . . bearing, 13 . . . bearing, 15 . . . O-ring, 16 . . . opening, 17 . . . coolant passage, 18 . . . through hole, 19 . . . inlet passage, 20 . . . opening, 22 . . . connecting member, 22A . . . O-ring, 23 . . . output shaft, 23A . . . pressing portion, 25 . . . seal element (elastomer), 26 . . . washer, 27 . . . pipe coupling, 28 . . . lip seal, 29 . . . origin sensor, 29A . . . magnet holder, 29B . . . magnetism detecting element, 30 . . . connector, 31 . . . nozzle, 32 . . . nozzle holder, 33 . . . nozzle body, 34 . . . bore, 34A . . . large diameter portion, 35 . . . screw hole, 36 . . . sealing groove, 37 . . . sealing groove, 38 . . . O-ring, 39 . . . O-ring, 40 . . . fixed groove, 41 . . . set screw, 42 . . . screw hole, 43 . . . nozzle chamber, 44 . . . nozzle through hole, 45 . . . screw portion, 46 . . . nozzle passage, 50 . . . Oldham coupling portion, 51 . . . coupler, 51A . . . groove, 52 . . . joint, 52A . . . protruding part, 52B . . . protruding part, 52C . . . slit, 52D . . . slit, 52E . . . through hole, 53 . . . hub, 53A . . . groove, 53B . . . cavity, 55 . . . screw hole, 56 . . . screw, 57 . . . nut, 61 . . . lead wire, 62 . . . resin, 63 . . . circuit board, 64 . . . plastic container, 65 . . . screw.

The invention claimed is:

1. A coolant application device comprising:
a motor with a driving shaft,
a driven shaft driven and rotated by the driving shaft,
a nozzle that rotates by being connected to the driven shaft, the nozzle spouting coolant in a perpendicular direction to the driven shaft, and
an Oldham coupling provided between the driving shaft and the driven shaft,
wherein the Oldham coupling comprises an intermediate member that engages a member of a driving shaft side at one end surface thereof and that engages the driven shaft or a member of a driven shaft side at the other end surface thereof,
an opening is provided at the center of the intermediate member, and the driving shaft passes through the opening,
the intermediate member has a recessed part or a protruding part formed parallel to a radial direction for engaging at least one of the driven shaft and the member of the driven shaft side, and
grooves parallel to a radial direction are formed at both sides of the recessed part or at the protruding part.

2. The coolant application device according to claim 1, wherein the intermediate member has a lower hardness than that of the driving shaft side member.

3. The coolant application device according to claim 1, wherein the intermediate member has a lower hardness than that of the driven shaft or the driven shaft side member.

4. The coolant application device according to claim 1, further comprising a space for housing a circuit board in which a lead wire is connected,
wherein the circuit board is sealed with resin inside of the space.

5. The coolant injection device according to claim 4,
wherein the circuit board in which the lead wire is connected is embedded in resin in a container placed inside of the space.

6. A coolant application device comprising:
a nozzle for spouting coolant,
a motor for controlling a spouting direction of the coolant by rotating the nozzle,
a housing,
a hollow shaft that is inserted rotatably and in a liquid-tight manner in the housing and that comprises a coolant passage inside thereof,
multiple through holes provided on a side wall of the hollow shaft, and
an inlet passage provided in the housing and connected to communicating with the coolant passage via the multiple through holes,
wherein the nozzle is connected to the hollow shaft, and the hollow shaft is connected to an output shaft of the motor via an Oldham coupling,
the Oldham coupling comprises an intermediate member that engages a member of an output shaft side of the motor at one end surface thereof and which engages the hollow shaft or the member of the hollow shaft side at the other end surface thereof,
an opening is provided at the center of the intermediate member, and an output shaft of the motor passes through the opening,
the intermediate member has a recessed part or a protruding part formed parallel to a radial direction for engaging at least one of the hollow shaft and the member of the hollow shaft side, and
grooves parallel to a radial direction are formed at both sides of the recessed parts or at the protruding part.

7. The coolant application device according to claim 6, wherein the intermediate member has a lower hardness than that of an output shaft side member of the motor.

8. The coolant application device according to claim 6, wherein the intermediate member has a lower hardness than that of the hollow member or the hollow shaft side member.

* * * * *